Nov. 22, 1949     F. F. HARTMAN     2,489,179
WHEEL
Filed Feb. 26, 1946     2 Sheets-Sheet 1
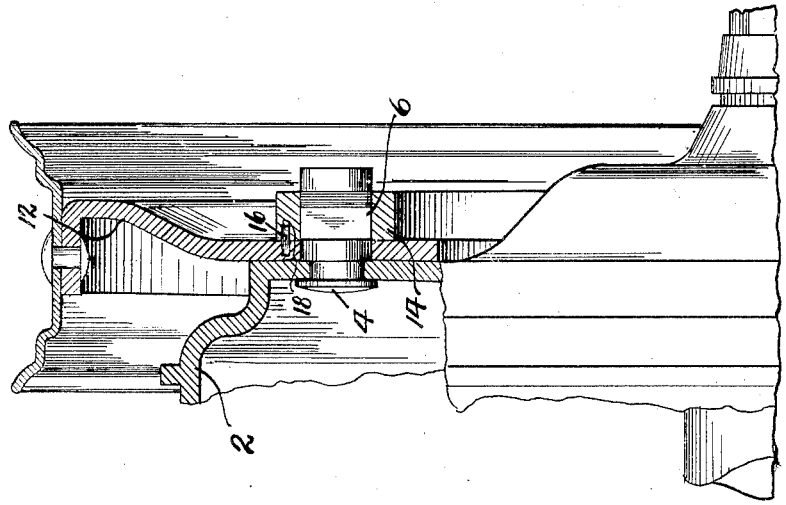
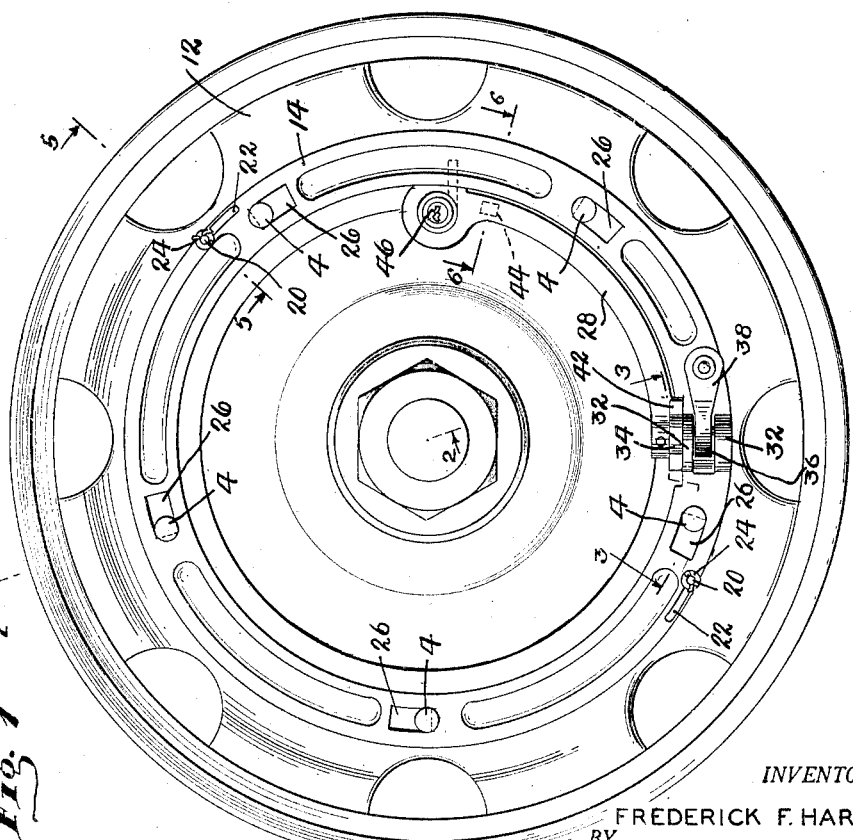
INVENTOR.
FREDERICK F. HARTMAN
BY James G. Bethell
ATTORNEY Nov. 22, 1949     F. F. HARTMAN     2,489,179
WHEEL
Filed Feb. 26, 1946
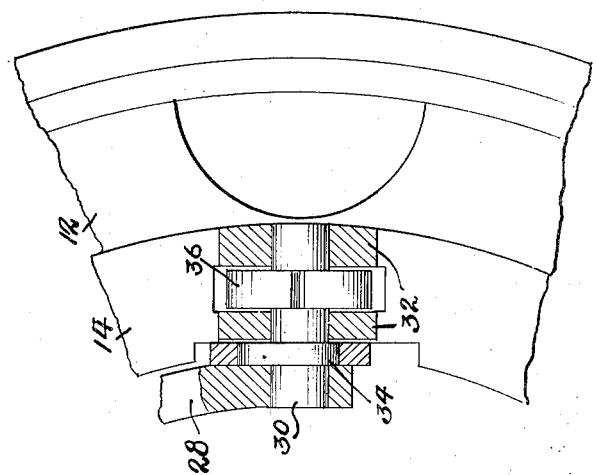
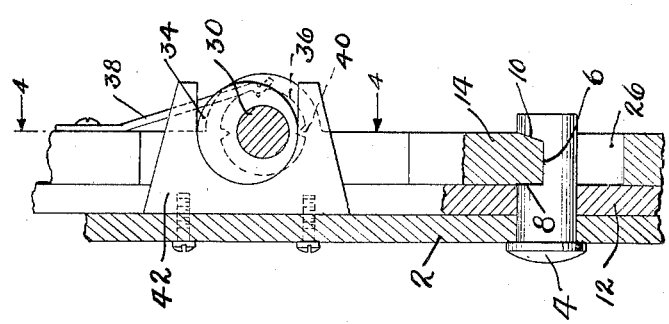
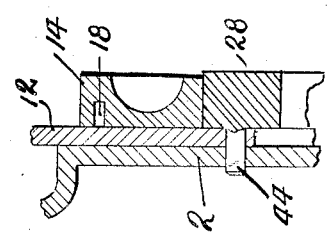
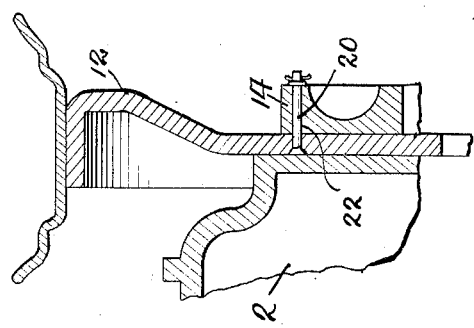
INVENTOR.
FREDERICK F. HARTMAN
BY
*James G. Bethell*
ATTORNEY Patented Nov. 22, 1949

2,489,179

UNITED STATES PATENT OFFICE 2,489,179

WHEEL

Frederick F. Hartman, New York, N. Y.

Application February 26, 1946, Serial No. 650,233

8 Claims. (Cl. 301—9)

This invention relates to an improvement in vehicle wheels and has for one of its objects to provide a wheel of novel construction whereby mounting and removing the wheel is greatly simplified.

A further object of my invention is to provide a demountable wheel for automobiles and other vehicles which is of such construction as to require minimum modification of existing wheel supporting structures.

In the conventional automobile, for example, the brake drum, which rotates with the wheel, is provided with a plurality of outwardly projecting studs or bolts permanently secured in place. These studs or bolts extend through holes provided for the purpose in the wheel nave or hub, and nuts are then screwed upon the bolts to hold the wheel secure to the brake drum. To remove the wheel it is necessary of course to remove these nuts, and while this does not require a great degree of skill, it does require considerable strength and considerable time.

The instant invention contemplates a construction wherein there are no nuts to remove, and wherein it is merely necessary, in removing the wheel to turn a key in a lock and manipulate a lever, while to mount the wheel is just as simple an operation. Inasmuch as the wheel cannot be removed without first manipulating a lock, my invention provides against theft of the wheels from a vehicle, which with conventional constructions is not an unusual occurrence.

In my improved construction the brake drum is equipped with outwardly projecting studs similar to those now employed except they are not threaded and each stud is notched in one side thereof. Secured to the wheel is a ring provided with a plurality of slots corresponding in number and spacing to the studs on the brake drum. When the wheel is placed in position with the brake drum studs projecting through these slots, an arm or lever attached to the ring is moved about its pivot causing the ring to rotate into position where the end of each ring slot engages the notch in the side of the corresponding brake drum stud. In this position the arm lies flat against the face of the wheel and is locked in this position.

A better understanding of my invention will be had from a study of the accompanying drawings, in which Fig. 1 is an elevational view of my improved wheel;

Fig. 2 is a section on the line 2—2 of Fig. 1;

Fig. 3 is a section on the line 3—3 of Fig. 1;

Fig. 4 is a part sectional elevational view of the line 4—4 of Fig. 3;

Fig. 5 is a section through Fig. 1 on the line 5—5; and

Fig. 6 is a section through Fig. 1 on the line 6—6.

Referring to the drawings in detail, 2 designates a vehicle brake drum, provided on its outer face with a plurality of regularly spaced driving studs 4 projecting outwardly normal to the face of the brake drum. These studs are permanently anchored in place.

The side of each stud is notched as shown at 6, the rear face 8 of each notch being perpendicular to the axis of the stud while the front or outer face 10 of the notch inclines inwardly toward the brake drum (see Fig. 3).

12 designates the vehicle wheel.

Mounted on the outer face of the wheel 12 is an annulus or ring 14. The wheel face is preferably provided with a plurality of equally spaced guide pins 16, while the rear face of the ring 14 is grooved as shown at 18 for the reception of these pins (see Figs. 2 and 6).

The annulus or ring 14 is held to the face of the wheel 12 by two or more studs 20 permanently anchored in the wheel face and projecting outwardly of the wheel through slots 22 in the ring, the ring being held against removal from the wheel by washer and cotter pin 24.

From the description thus far given it will be seen that while the ring 14 may be rotated slightly relatively to the wheel, the two may be considered a unitary structure and may be handled as such.

In addition to the construction described the ring 14 is provided with a plurality of arcuate slots 26. The number and center to center spacing of these slots corresponds to the number and spacing of the driving studs 4 heretofore referred to, so that when the wheel and ring are in position on the brake drum each stud 4 will project through a hole in the wheel and a corresponding slot 26 in the ring. As will be seen from Fig. 3 for example the ring 14 at one end of each of the arcuate slots 26 is slightly beveled, so that with the ring and wheel assembled the ring will catch or hook into each of the notches 6 in the side of the driving studs 4.

While the slots 26 in the ring 14, which receive the driving studs 4 are elongated so as to permit of slight rotation of the ring relatively to the wheel, when the ring is in the position shown in Figure 1 removal of the ring and hence of the wheel from the driving studs is prevented by the engagement of the ring with the notches 6 in the driving studs. Hence to prevent removal of the wheel and ring it only remains to prevent rotation of the ring relatively to the brake drum or more accurately relatively to the driving studs.

This I accomplish by the mechanism now to be described, this mechanism when in one position functioning as just indicated, but when moved to another position moving the ring into position where the ring and wheel can be pulled off the studs 4 as a unit.

Referring more particularly to Figs. 1, 4, and 6, it will be seen that 28 designates an arcuate lever or arm, pinned or otherwise rigidly secured to a stub shaft 30 which is carried by the ring 14 and extends radially thereof, the bearings for the shaft being designated 32.

Mounted rigidly upon the stub shaft 30 are a cam 34 and what I shall term an indexing member 36, the latter being concentric with the shaft 30. As will be seen from Fig. 4 the ring 14 has been cut away to accommodate the cam and indexing members to permit of their free rotation as stub 30 is rocked by manipulation of the lever 28. Carried by the ring 14 is spring arm 38 the end of which cooperates with notches 40 in the face of the indexing member.

The cam 34 cooperates with a fixed bearing surface provided by a bifurcated member 42 which is rigidly secured to the outer face of the brake drum 2, as shown in Fig. 3.

On the inner face of the lever 28 is a locking lug or stud 44, which when the lever 28 is depressed extends through the wheel 12 and the brake drum 2 so that relative rotation of these two members is prevented.

At its free end the lever 26 is provided with a lock 46 the bolt of which cooperates with a ring 14 to lock the lever in depressed position.

In the drawings I have shown the wheel in place on the brake drum and it will be appreciated that neither it nor the ring 14 can rotate relatively to the brake drum because of the engagement of the driving studs 4 carried by the brake drum and the locking stud 44 with the ring 14, wheel 12 and the brake drum 2.

To remove the wheel it is merely necessary to unlock the lever 28 and draw the free end of the same away from the wheel face. In swinging the lever 28 to position where it stands perpendicular to the face of the wheel, the indexing member 36 will be rotated to cause the spring arm 38 to move out of its original notch in the periphery of member 36 and engage the next notch which is a quarter turn away. This is a convenient way of locking the lever in its new position and facilitates handling of the wheel.

In swinging the lever to its new position the cam 34 is also rotated in the member 42 which as heretofore pointed out is fixed to the brake drum. Consequently the ring 14 is rotated in a direction to move the ends of the slots 26 in the ring out of the notches 6 in the driving studs 4.

In mounting the wheel upon the brake drum the operations just described are reversed. With the lever 28 standing perpendicular to the wheel face, the wheel and ring as a unit are slipped in place upon the studs 4, and the lever depressed to the position illustrated in Fig. 1, which through the cam 34 will effect a partial rotation of the ring 14 opposite to its previous direction to engage the ring in the notches in the driving studs 4 and to reinsert the locking stud 44 in apertures provided for that purpose in the wheel and brake drum. It remains then only to lock the lever closed and the mounting of the wheel is completed.

It will be appreciated from all of the foregoing that my invention provides a construction whereby a wheel may be mounted or demounted with the minimum of time and effort and without the use of any tool other than a key for the lock 46.

It will be appreciated furthermore that the wheel is locked in position when mounted, so that it cannot be removed accidently, while when deliberate removal is desired it is merely necessary to unlock the lever 28 and move the same until it stands perpendicular to the wheel face.

It is to be understood that changes in the details of construction and arrangement of parts may be made within the purview of my invention.

What I claim is:

1. In a device of the class described, the combination of a wheel, a mount therefor, a ring carried by the wheel and rotatable relatively thereto for removably attaching the mount and wheel to each other, a pivotally mounted arm carried by the wheel, and a cam actuated by movement of said arm for rotating said ring relatively to said wheel into latching engagement with said mount.

2. In a device of the class described, the combination of a wheel, a mount therefor, means carried by the wheel and rotatable relatively thereto for removably attaching the mount and wheel to each other, a pivotally mounted arm carried by the wheel, and a cam actuated by movement of said arm for rotating said first mentioned means relatively to the wheel into latching engagement with said mount.

3. In a device of the class described, the combination of a wheel, a mount therefor, means carried by the wheel and rotatable relatively thereto for removably attaching the mount and wheel to each other, a pivotally mounted arm carried by said wheel, a cam actuated by said arm for rotating said first mentioned means relatively to the wheel into latching engagement with said mount, and a lock for locking said arm into position to maintain said wheel in latching engagement with said mount.

4. In a device of the class described, the combination of a wheel, a mount therefor, means carried by the wheel and rotatable relatively thereto for latching the wheel and mount together, an arm pivotally carried by said wheel, a cam actuated by movement of said arm for rotating said latching means relatively to the wheel into latching engagement with said mount, and means carried by the said arm and actuated thereby when the arm is moved in a direction to move the latching means into latching position for preventing relative rotation of the mount and wheel to unlatched position.

5. In a device of the class described, the combination of a wheel, a mount therefor, a ring movably mounted on said wheel, an arm pivotally mounted on said ring, means carried by said arm and actuated thereby cooperating with said mount for moving said ring into latching engagement with said mount and a lock for locking said arm in position to maintain said ring and wheel in latching engagement on said mount.

6. In combination, a wheel, a mount therefor including a plurality of studs, a ring concentric with and carried by the wheel, said ring being provided with slots for receiving said studs, each stud being notched whereby the end of each of said slots may be latched to a stud, a lever pivoted on said ring, a cam carried thereby, and fixed means carried by the said mount and cooperating with said cam whereby movement of the lever toward the wheel effects sufficient rotation of the ring to latch the ring and studs to each other, movement of the lever in the opposite direction reversing the ring to unlock the same from said studs.

7. In combination a wheel, a mount therefor, a ring mounted on said wheel and slightly rotatable relatively thereto, an annular groove in the rear face of said ring, pins in the face of the wheel extending into said groove, studs projecting outwardly from the face of said mount and through said ring, notches in the side of each stud, and a lever mounted on the ring and cooperating with said mount whereby actuation of the lever will rotate the ring into latching engagement with the said notches.

8. In combination, a wheel a mount therefor, studs projecting outwardly from the face of said mount, a slotted ring mounted on said wheel, the slots of said ring receiving said studs, each of said studs being notched for the reception of the ends of said slot to prevent bodily movement of the wheel away from said mount, a lever pivoted on said ring, a cam carried thereby cooperating with said mount to rotate the ring when the lever is raised to free the ring of said studs, a driving stud carried by the underside of said lever and passing through the ring, wheel and wheel mount when the lever is depressed, thereby to prevent relative movement of the mount, wheel and ring.

FREDERICK F. HARTMAN.

REFERENCES CITED

The following references are of record in the file of this patent:

UNITED STATES PATENTS

| Number | Name | Date |
|---|---|---|
| 1,909,286 | Lebel | May 16, 1933 |
| 2,018,190 | Robinson | Oct. 22, 1935 |
| 2,031,114 | Lebel | Feb. 18, 1936 |
| 2,237,702 | Harrison | Apr. 8, 1941 |

FOREIGN PATENTS

| Number | Country | Date |
|---|---|---|
| 146,029 | Great Britain | Nov. 7, 1919 |